United States Patent [19]
Yancey

[11] 4,326,590
[45] Apr. 27, 1982

[54] PLANT-HARVESTING DEVICE FOR USE WITH VARIABLE CROP ROW SPACING

[75] Inventor: Michael J. Yancey, Puyallup, Wash.

[73] Assignee: Weyerhaeuser Company, Tacoma, Wash.

[21] Appl. No.: 200,863

[22] Filed: Oct. 27, 1980

[51] Int. Cl.³ .......................................... A01D 25/00
[52] U.S. Cl. ...................................... 171/61; 56/106
[58] Field of Search ............... 171/61, 118, 62; 56/98, 56/105, 106, 104

[56]  References Cited
U.S. PATENT DOCUMENTS

| | | | |
|---|---|---|---|
| 2,291,784 | 8/1942 | Balazs et al. | 171/61 |
| 2,855,058 | 10/1958 | Krier et al. | 171/61 |
| 3,497,013 | 2/1970 | Baker | 171/61 |
| 3,693,721 | 9/1972 | Arnold et al. | 171/61 |
| 3,743,024 | 7/1973 | Mayo et al. | 171/61 |
| 3,964,550 | 6/1976 | Storms | 171/61 |
| 3,968,842 | 7/1976 | Puch, Sr. et al. | 171/61 |
| 4,084,396 | 4/1978 | Fritz et al. | 56/98 |
| 4,086,749 | 5/1978 | Greiner et al. | 56/106 |
| 4,113,022 | 9/1978 | Balinte et al. | 171/61 |
| 4,185,696 | 1/1980 | Williams et al. | 171/61 |

Primary Examiner—Paul J. Hirsch
Attorney, Agent, or Firm—Weyerhaeuser Company

[57] ABSTRACT

The invention is a plant lifting apparatus of the opposed belt type that can be quickly adjusted in the field to accommodate different plant row spacings. The lifting belts are carried on individual supporting frames. These, in turn, are pivotally mounted at their proximal ends to a subframe member. The distal plant receiving ends of the supporting frames are bridged by spreading means which vary the spacing between adjacent pairs of lifting belts. Preferably the outer belt supporting frames are adjusted separately. The inner pairs are bridged by toggles, turnbuckles or similar means that control their spacing within the limits set by the outer supporting frames.

10 Claims, 8 Drawing Figures

PLANT-HARVESTING DEVICE FOR USE WITH VARIABLE CROP ROW SPACING

BACKGROUND OF THE INVENTION

This invention is a device for harvesting or lifting rooted plants that is readily adaptable for use with crops that are planted with variable row spacings. It is particularly suitable for lifting plants grown in rows in nursery beds when the plants are to be later transplanted. The device is especially well adapted for nursery use in lifting tree seedlings that will later be used for reforestation of unstocked lands.

Many food crops are first grown in nursery beds rather than planted directly. These are then removed from the beds and transplanted into fields or forest land where the crop matures. Among these plants might be mentioned many leaf vegetables and tomatoes as well as tree seedlings. It is important that the root structure of the plants is relatively undamaged when they are lifted from the nursery beds. Otherwise, the combined shock of transplanting and root loss will cause a major adverse effect on ultimate crop yield. The same situation also applies to coniferous trees to be used for reforestation. Tree seedlings are grown in extremely large nurseries in an open-field situation. In the United States alone, the annual requirements are literally hundreds of millions of seedlings. As is the case with vegetables, a major crop gain can be expected if the seedlings can be harvested with relatively intact root structures.

A number of harvesting devices are available for lifting row plants that are subsequently to be transplanted. Among these might be mentioned Arnold et al., U.S. Pat. Nos. 3,693,721; Mayo et al., 3,743,024; Storms, 3,964,550; and Puch, Sr, et al., 3,968,842. All of these lifters grip the plants a short distance above the ground line between pairs of opposed resilient belts. As the machine is moved down the row the plants are guided between the belts and literally pulled out of the ground. The the best pairs transport them to a receiving station.

While many crops are planted with standard row spacings, this is not always the case. In the United States it is fairly conventional for tree seedlings to be planted in beds containing eight rows spaced six inches apart. However, some seedlings are transplanted and allowed to grow in the nursery for an extra year in order to increase vigor. Transplanted seedlings are typically grown in six rows which are on eight-inch centers. To the present time, no single harvester has been available which can be adapted to lift both of these tree crops. The nursery has had to bear the considerable expense of buying separate harvesters to use on the different row spacings.

SUMMARY OF THE INVENTION

The present invention is an improved plant-harvesting or lifting means that is readily adaptable to lift row crops at different center-to-center spacings between the rows. The device is generically a lifter which uses opposed moving belts to grasp the plants at or near the ground line, lift them away from the soil matrix, and transport them to a receiving station. Provision is made to vary the spacing between the belt pairs at the location at which the plants are first received. The belts themselves are carried on supporting means or frames which are pivotally mounted to a sub-frame member of the main lifting device. Adjusting means are provided for changing the distal end spacing between adjacent pairs of belt supporting means. This is done while still maintaining the opposed belt pairs in a plant-grasping relationship.

One version of the invention is adapted for readily shifting belt spacing between one of two pre-selected widths. Other versions enable the belt spacing to be adjusted continuously between limits which are established by the geometry of the machine. This is accomplished by pivotally mounting the belt supporting frames at their proximal ends so that they are movable or swingable in a side-to-side relationship. Spacing adjusting means are then mounted near the distal ends of the belt supporting means. These can be screws, toggles, or the like that adjust the belt pairs to the desired center-to-center distance to accommodate the crop rows.

It is thus an object of this invention to provide a plant-harvesting or lifting means which can be used to harvest crops in which the spacing between crop rows is not a constant distance.

It is a further object to provide a plant-harvesting or lifting means that can be readily shifted in the field to accommodate different crop row spacings.

It is another object to provide a plant-lifting means which is versatile in its application so that one machine may now do the job which formerly required a plurality of lifting machines.

These and other objects are accomplished in a manner which can be readily understood by those skilled in the art by reference to the following description and figures.

A DESCRIPTION OF THE PREFERRED EMBODIMENTS

The operation of the present invention can best be understood by referring to the following description in conjunction with the drawings. The embodiments described will show the use of the harvesting apparatus for lifting tree seedlings from a nursery bed. It is to be understood that the device is equally useful for lifting other crops which are to be harvested with the root structure intact.

Figure 1:
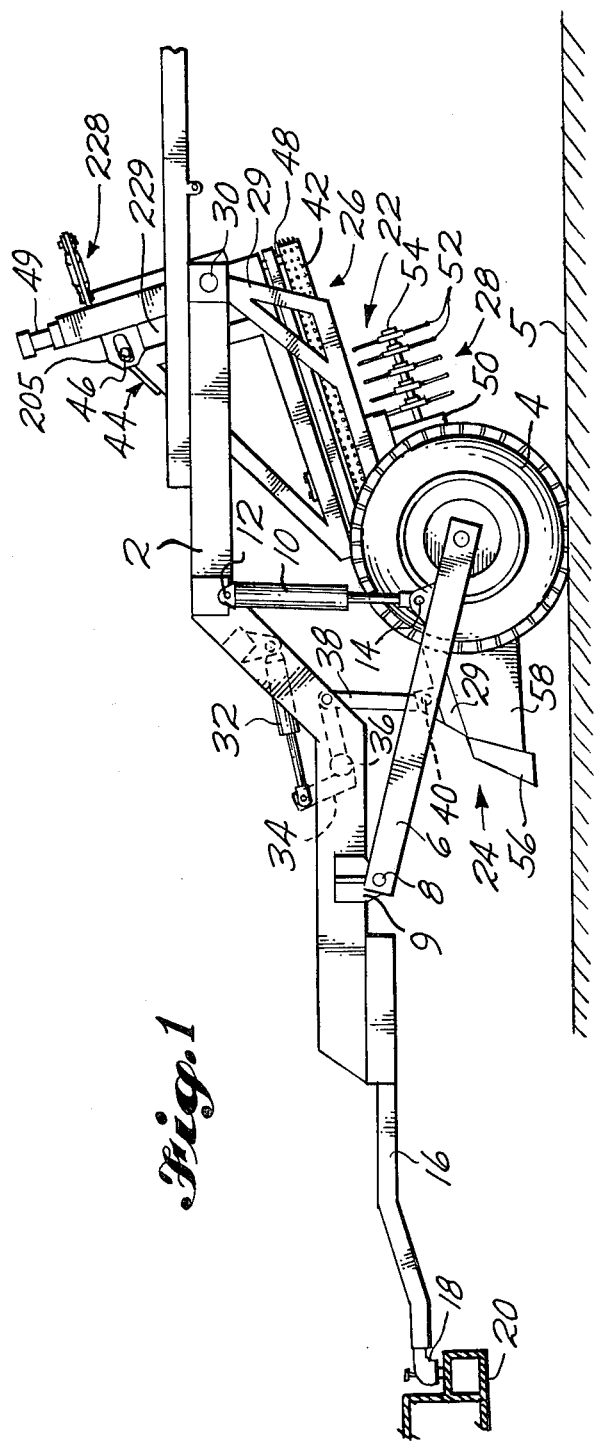
FIG. 1 is a simplified side elevation showing an overall view of the improved harvester.
Figure 2:
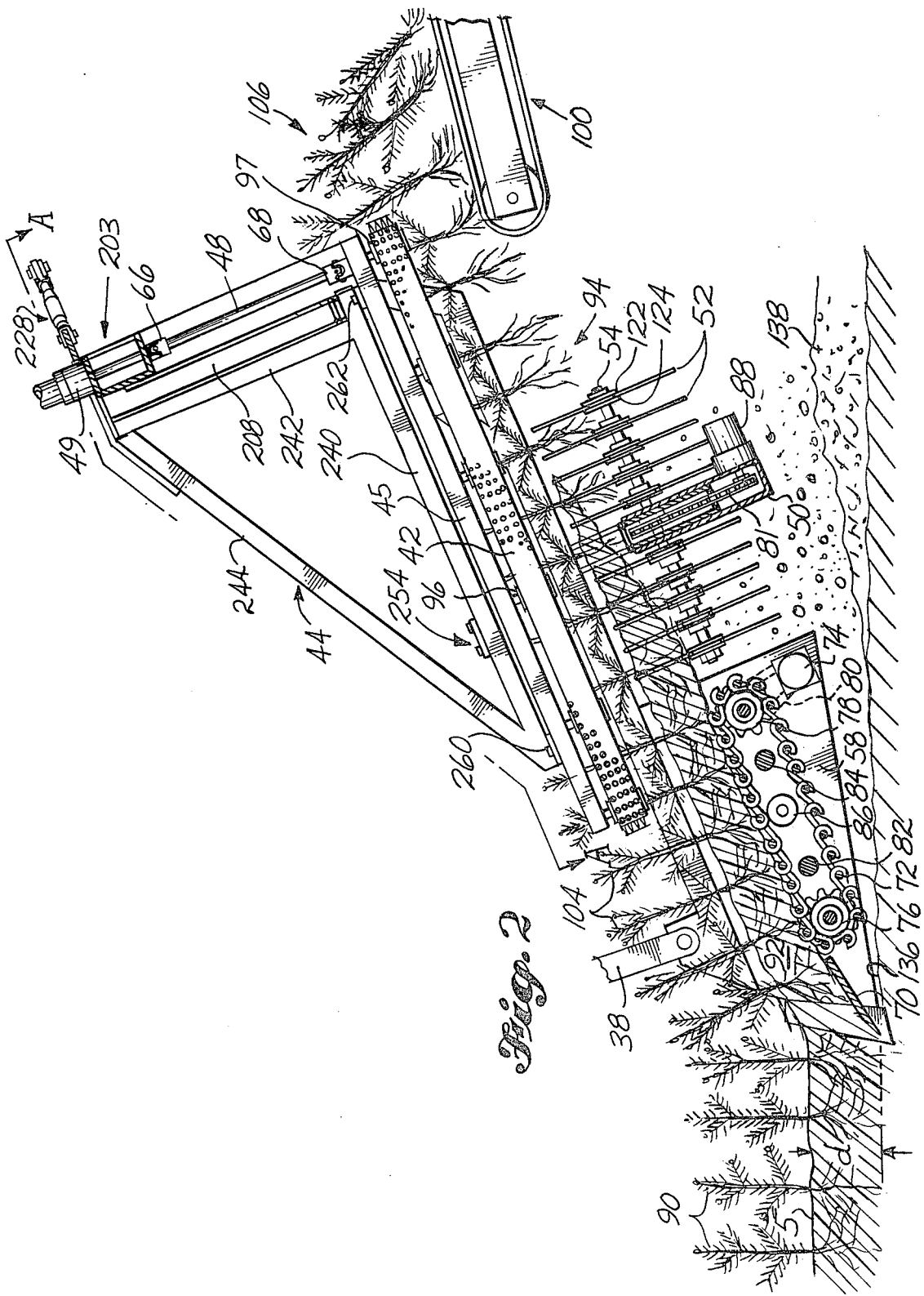
FIG. 2 is a partially cut-away side elevation to larger scale showing essential operating elements of the improved harvester.
Figure 3:
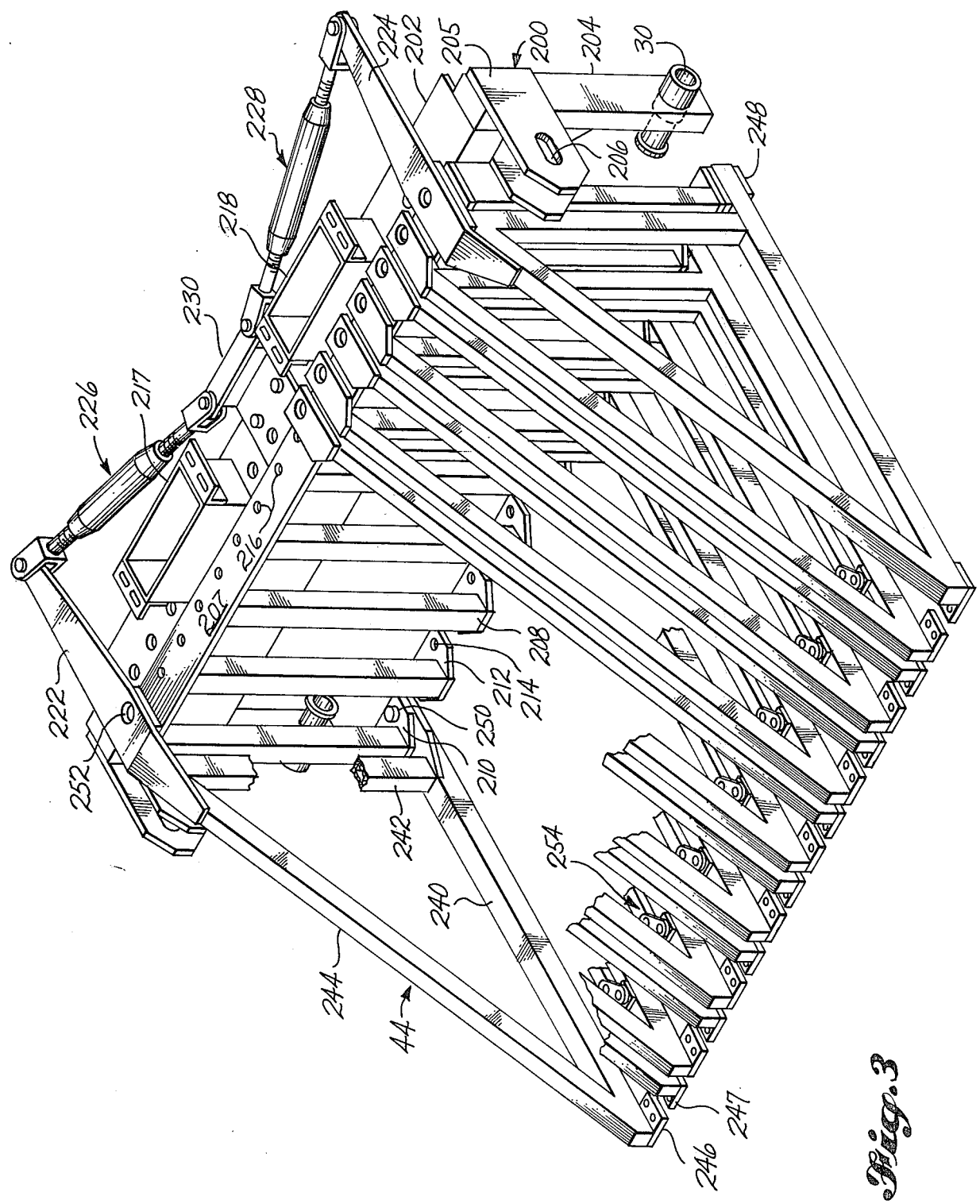
FIG. 3 is a partially cut-away isometric view showing the mechanism by which belt spacing is varied.

Referring principally to FIGS. 1 and 2, the harvester comprises a main frame 2 on which are mounted a pair of tired wheels 4 which rest on ground surface 5. The wheels are mounted on wheel-support arm 6 pivoted at pin 8 into plate 9 which is welded or otherwise attached to the main frame. During operation, the depth below the ground surface at which the harvester operates is controlled by hydraulic cylinder 10, attached by clevis arrangements to the main frame at 12 and to the wheel-support arm at 14. The main frame is attached to a source of motive power by tongue 16 and hitch 18 which are coupled at 20 to a prime mover. The harvesting device may be selfpropelled, although in its preferred version it would be towed by an agricultural tractor. One suitable lifting mechanism is indicated generally at 22. In the version shown, this consists of a lifting means 24, a plant-gripping and transport means, shown generally at 26, and a root-untangling and soil-removal means shown at 28. These are attached to a sub-frame 29 which is pivoted to the main frame at 30. While being transported, the harvesting mechanism is held clear of the ground by hydraulic cylinder 32 working through bell crank 34. The arms of the bell crank are attached to a pivoting member 36 set in sockets attached to the main frame. A linkage bar 38, which may be adjustable, is coupled from the bell crank to the sub-frame at pivot point 40.

The plant-gripping and transport means 26 comprises pairs of opposed gripping belt assemblies 42 which are supported from the sub-frame 200 by support means, here indicated as triangular frames shown generally at 44. It is desirable to be able to control the belt angle with respect to the sub-frame 29. This may be accomplished by a bolt and slot arrangement with bolt 46 operating through slots 206 in flanges 205 and secured into sub-frame member 229 which is an integral extension of sub-frame 29. Adjustment may conveniently be made by a turnbuckle or screw, not shown. The pick-up belts are suspended from rigid members 45, one of which is bolted at 260, 262 to each individual supporting means 44. The belts are carried on idling pulleys 96 and are caused to move by driven pulley 97. This pulley is driven through shafts 48 and universal joints 66, 68 by a hydraulic or other type of drive motor 49.

One suitable lifter mechanism consists of side-cutting blades 56 and a horizontal undercutting blade 70 which serves to sever an intact body of soil containing the plants and their root structure. As the harvesting apparatus is drawn forward by the prime mover, this body of soil is directed upward along the inclined undercutting blade 70 whereupon it moves onto the conveyor means 24. Here the plants are later individually grasped by the gripping and transporting belts. In this example, the conveyor means comprises a rod chain 72 which is driven by hydraulic motor 74 acting through drive chain 80 on sprocket 78. The front portion of the drive chain is carried on idling sprocket 76. Chain support roll 86 prevents excessive deflection of the rod chain by the weight of the severed body of soil. As an alternative construction, the conveying means may be a screen of fairly large mesh size. The conveyor means is held within side plates 58 which serve as bearing mounts for the moving parts. These are held together by tie bars 82 and 84.

A portion of the soil will fall through the openings in the rod chain or screen. While this body of soil is still relatively intact the plants are gripped between opposed resilient belts 42. These may either be of smooth or knobby construction although the latter gives a more positive gripping action of the plants being harvested. The plants are normally gripped just above the ground line so that the roots will depend below the gripping and transporting belts. In this position the bulk of the soil will be removed by arms 52 of the root-untangling and soil-removal means. The embodiment shown, this comprises a multiplicity of arms 52 mounted on parallel shafts 54. The number of shafts used and their spacing is a function of the number of rows of plants being lifted. The drive mechanism for the shafts is contained in housing 50. This mechanism is driven by motor 88 through chain 81. The individual arm assemblies are conveniently manufactured by mounting the arm elements between clamping plates 122 and 124 which are held together by bolts or cap screws. In operation, the shafts of the root-untangling means are normally oriented essentially parallel to the paired belts which serve as the gripping and transporting means.

Seedlings 90 are shown growing in the ground in advance of the harvester. These are picked up in a body of soil 92 which has been severed by blades 70 and 56. The soil body is lifted onto the conveyor means 24 by the forward motion of the device. At about two thirds of the length of the conveyor means the plants are gripped by the paired belts. As they leave the conveyor means the residual body of soil retained in the roots is gently impacted by the rotating arms 52. Here roots 94 of individual plants are cleaned and separated.

At the off-bearing end, where the plants are discharged from the gripping belts they fall onto a conveyor means 100. Harvested plants 104 have now been effectively cleaned and singulated and are discharged at 106 where they are ready for packing.

As the plants were lifted, the original soil surface 5 was lowered by depth d to a new surface 138. This is raised to its approximate original height by the soil 138 removed from the plants in the root-cleaning operation.

The operation of the present improvement in the lifting belt assembly will now be described. This is mounted on a sub-frame, generally shown at 200, which comprises a transverse member 202 and vertical members 204. The transverse member may be the upper portion of a gear box generally shown at 203 (FIG. 2). The vertical members 204 support pairs of flanges 205 which may contain one or more slots 206. These flanges embrace vertical sub-frame members 229 (FIG. 1), to control belt angle. The front of transverse member 202 bears a flange 207 for virtually its entire width. Welded or otherwise attached to flange 207 are depending members 208. These members have flanges at their lower ends indicated at 210 for the outside members and 212 for interior members. The flanges are drilled with apertures 214 which correspond to apertures 216 drilled into the flange-like member 207. One or more belt drive motor mounts, indicated here at 217 and 218, are seen on the upper surface of transverse sub-frame member 202. It will be understood that the belts may be driven by individual motors or may be geared together in any desired combination.

The belt assembly supporting means 44 are pivotally mounted at their proximal ends to the sub-frame 200. These supporting means are conveniently constructed as right-triangles 44. They comprise a lower horizontal member 240, a vertical member 242, and a diagonal member 244. They further carry mounting plates indicated as 246 on the outside supporting members and 247 for those in the interior portion of the mechanism. Similar rear-mounting plates are shown at 248. These hold the rigid members 45 on which the belt drive and idling sheaves are mounted. The belt-supporting members are swingably mounted to the sub-frame by loose bolts at 250 and 252 and thus are cantilevered from their proximal ends.

The outermost or lateral belt-supporting means have welded-on extension ears 222, 224. These are attached by turnbuckles or other adjustment means, shown here as 226, 228, to an extension of the sub-frame at 230. Each pair of interior or medial frames is shown with a forward- or distally mounted toggle mechanism 254. The toggle means bridge each pair of adjacent supporting means except the two outermost so that when 1, 2, 3, . . . n supporting means are present, where n will always be an even number, each even-numbered interior supporting means is toggled to its adjacent higher odd-numbered means. It should be understood that other means such as screws or turnbuckles are functionally equivalent to the toggle mechanisms.

Figure 6:
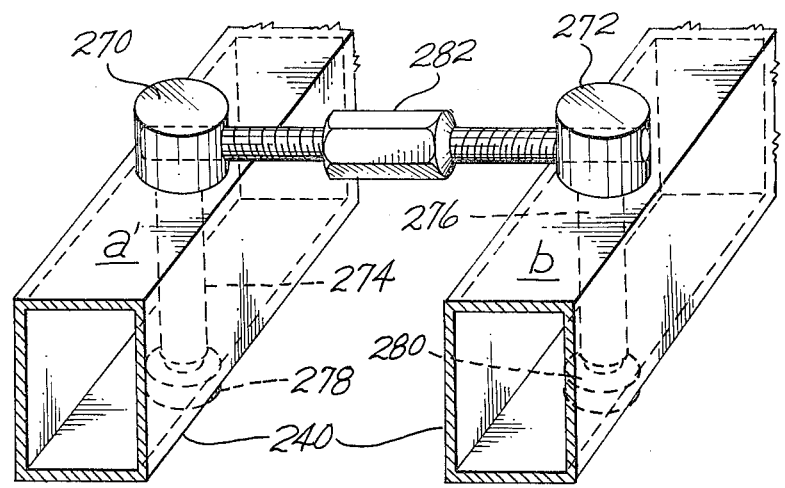
FIG. 6 is a fragmentary isometric view showing an alternative means of adjusting spacing of the pickup sheets.
Figure 7:
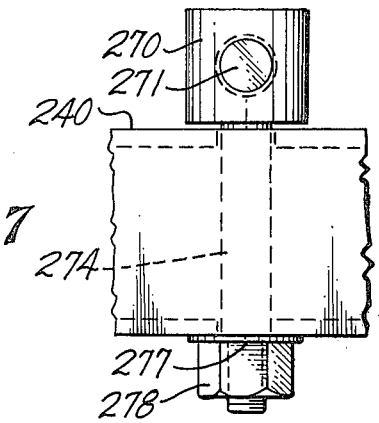
FIG. 7 is a cross sectional detail taken from FIG. 6.
Figure 8:
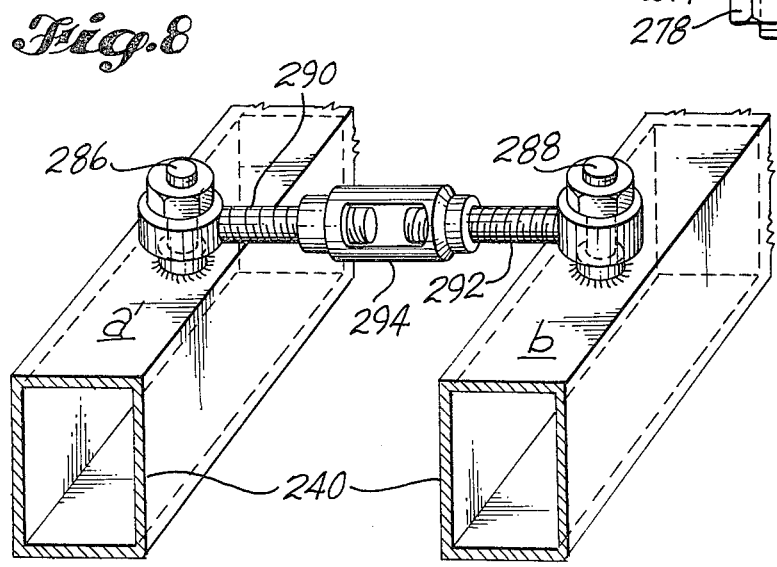
FIG. 8 is also a fragmentary isometric view showing another alternative means of adjusting spacing of the pickup belts.

The spreading means which position of the support arms can be made continuously variable within the extreme limits set by the outermost support arms. FIGS. 6 through 8 show two ways in which this can be accomplished. In FIG. 6, holes are drilled through the lower members 240 of the support arms at some appropriate locations near their distal ends. These receive studs 270, 272. The studs have shanks 274, 276 and may be shouldered as at 277 to permit free rotary movement. They are retained in the support arm by nuts 278, 280. The heads for the studs are transversely drilled at 271. One stud will be tapped for a left-hand thread, and the other for a right-hand thread. They are then bridged by an appropriately threaded adjustment rod 282. Spacing between the support arm pairs can be adjusted simply by turning the adjustment rod clockwise or counterclockwise.

FIG. 8 shows another version in which the spacing of the support arms can be continuously adjusted within the range provided. The lower members 240 are provided with studs or shouldered bolts 286, 288. These retain the opposite screws 290, 292 of a turnbuckle having body 294. Adjustment is easily accomplished merely by turning the body the requisite amount in a clockwise or counterclockwise direction. In normal agricultural situations this degree of versatility will not usually be needed but it can be readily built into the machine if desired.

Figure 4:
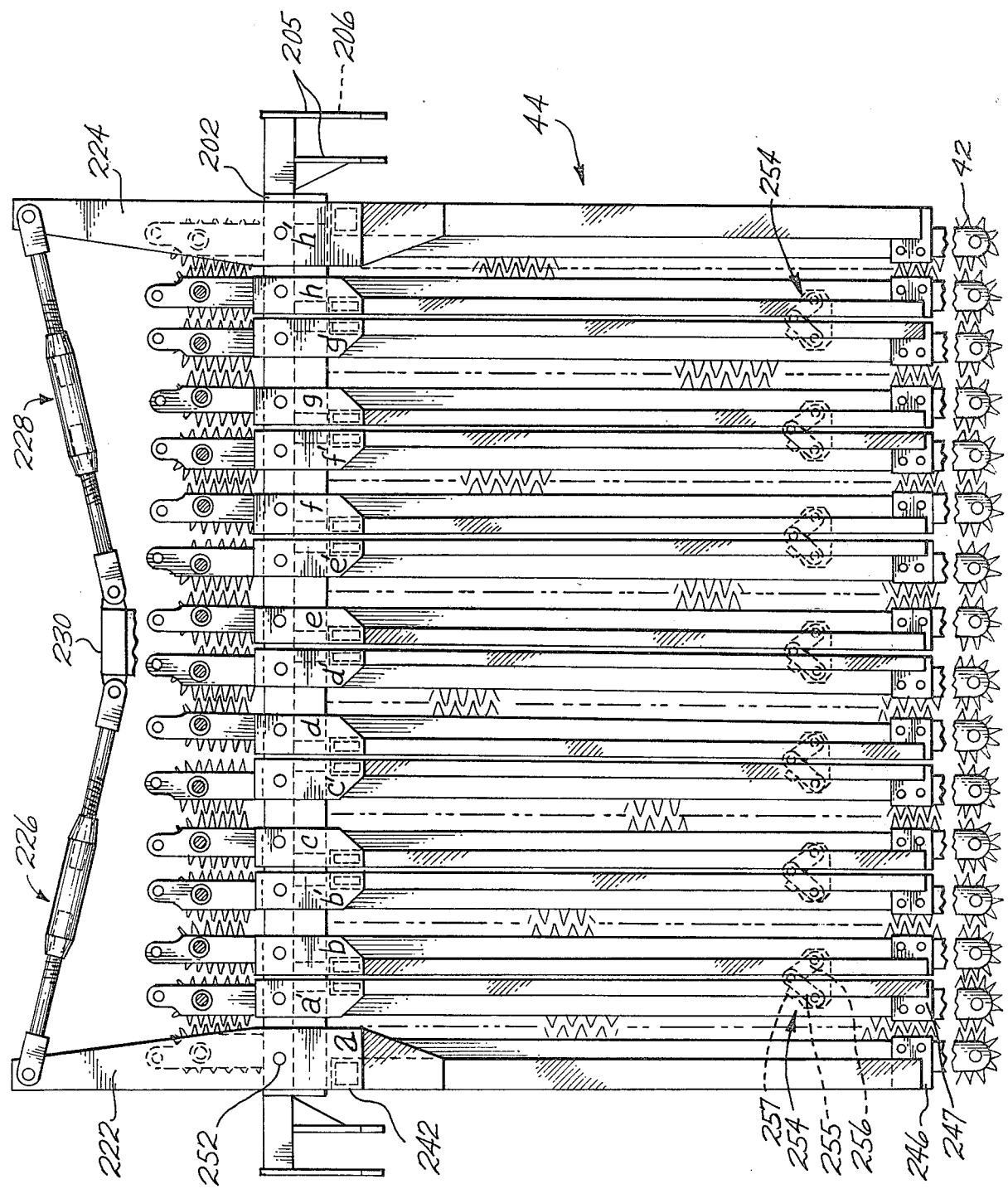
FIG. 4 is a top view taken along line A—A of FIG. 2 showing the harvester in position to lift up to eight narrowly spaced rows of plants.
Figure 5:
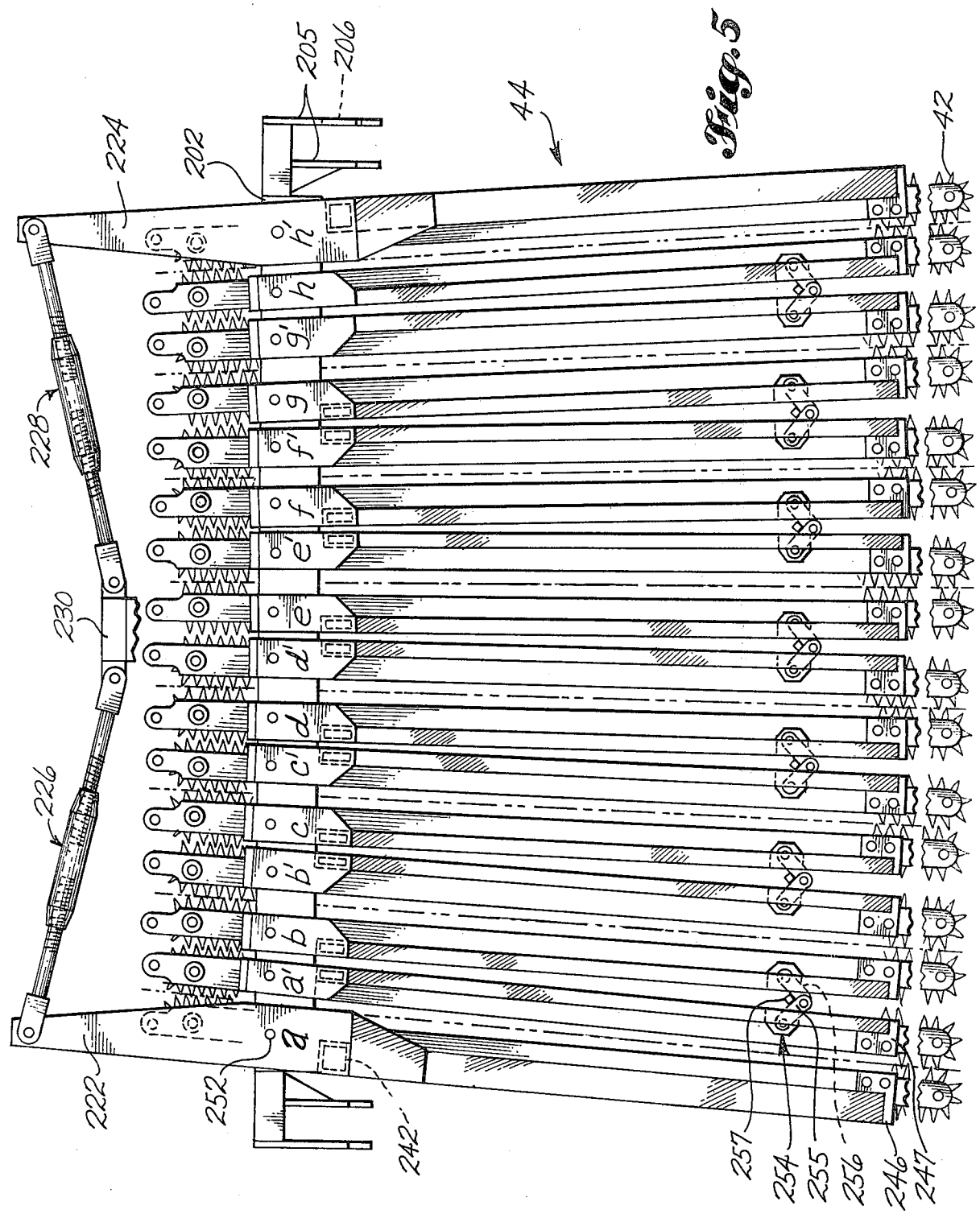
FIG. 5 is a view looking down on the harvester along line A—A of FIG. 2 in which the pick-up means are positioned to lift up to eight more widely spaced rows of plants.

Operation of the apparatus will now be described, indicating how it can be readily adapted to lift crops which are planted at different row spacing. FIG. 4 shows the belt-support means arrange to lift crops which are planted on relatively close row spacing. Using the example of a tree nursery, this could be eight rows of seedlings planted on six-inch centers. Here the spreading means or turnbuckles 226, 228 are screwed so that the outer support means or triangular frames are at a relatively inward position. The toggles 254 are flipped and locked with a center pivot oriented toward the rear of the lifting machine. The frames a,a'; b,b'; c,c', etc., support belt pairs in which the belts are moving in opposite rotation, with each similarly lettered pair providing the lifting and transporting means for a single row.

If it is desired to adjust the lifter to pick up rows on wider spacing, for example rows at eight-inch spacing, all that is necessary is to turn the turnbuckles 226, 228 so that the members a and h' are moved relatively outward. Normally, stops would be provided in order to simplify positioning. All that is then necessary is to flip the toggles forward to spread the interior supporting arms into their new orientation. Toggle arms 255, 256 are equipped with stops 257 so that proper adjustment is automatic and rapidly made in a matter of minutes in a field situation. Lifting belt pairs are now more widely spaced and the harvester is ready to proceed to lift the crops planted on wider row centers. In a case where only six rows were being lifted the two outer belt pairs would not be utilized. It is not necessary to harvest a number of rows equal to the number of belt pairs. In the examples pictured, anywhere between one and eight rows can be lifted.

There is a minor displacement of the extreme proximal ends of the supporting means when they are shifted from one position to another. Provision must be made for the belt drive means to adjust accordingly. This is easily done by making a sliding fit between the lower universal joint 68 and the shaft or the drive sheave 97. An unset key or spline joint assures adequate flexibility without interfering with power transmission.

While the versions illustrated represent the best mode known of practicing the invention, it should be evident to those skilled in the art that there are many structural variations which could be introduced which would be fully within the scope and intent of the present invention. For example, the turnbuckles 226 and 228 could be replaced with hydraulic cylinders, and many variations could be introduced into the mounting of the supporting members. It is the intention that the scope of the invention should be limited only by the following claims.

What is claimed is:

1. In a plant lifting apparatus of the type utilizing opposed belts for grasping and transporting a plurality of rows of plants, the improvements which comprise:
    a. individual supporting means for each pickup belt;
    b. sub-frame means for mounting the supporting means on the lifting apparatus;
    c. pivot means which attach the individual supporting means to the suframe in a swingable side-by-side relationship;
    d. adjusting means for moving the lateral supporting means between relatively inward and relatively outward positions, said adjusting means adapted to move the lateral supporting means independently of any medial supporting means,
    e. spreading means bridging the medial supporting means so that when n supporting means are present, where n is an even number and numbering begins with one of the lateral supporting means, each even-numbered medial supporting means is connected by a spreading means to its adjacent higher odd-numbered supporting means, but lateral supporting means 1 and n are not connected to a spreading means, said spreading means serving to shift the connected pairs between relatively inward and relatively outward positions while still maintaining opposing pickup belts in a plant grasping relationship.

2. The apparatus of claim 1 in which the supporting means for the belts are cantilevered from the sub-frame.

3. The apparatus of claim 1 in which the lateral supporting means have proximal end extensions and are adjusted by means operating between said extensions and said frame member.

4. The apparatus of claim 3 in which the adjustment means are turnbuckles.

5. The apparatus of claim 3 in which the adjustment means are hydraulic cylinders.

6. The apparatus of claim 1 in which the spreading means are located adjacent to the distal ends of the supporting means.

7. The apparatus of claims 6 in which the spreading means are toggles operating in one of two fixed positions.

8. The apparatus of claims 6 in which the spreading means are continuously adjustable between limits set by the extreme inward and outward positions of the lateral supporting means.

9. The apparatus of claim 8 in which the spreading means is a screw having right- and left-hand threads at opposite ends which operate into appropriately threaded areas on the bridged supporting means.

10. The apparatus of claim 8 in which the spreading means is a turnbuckle.

* * * * *

UNITED STATES PATENT AND TRADEMARK OFFICE
CERTIFICATE OF CORRECTION

PATENT NO. : 4,326,590

DATED : April 27, 1982

INVENTOR(S) : Michael J. Yancey

It is certified that error appears in the above—identified patent and that said Letters Patent is hereby corrected as shown below:

Column 7, line 6, "claims" should read --claim--

Column 7, line 9, "claims" should read --claim--

Signed and Sealed this

Twenty-first Day of December 1982

[SEAL]

Attest:

Attesting Officer

GERALD J. MOSSINGHOFF

Commissioner of Patents and Trademarks